March 17, 1925.
G. W. STEELE
1,530,215
AUXILIARY CHANGE SPEED GEARING FOR MOTOR CARS
Filed May 26, 1924
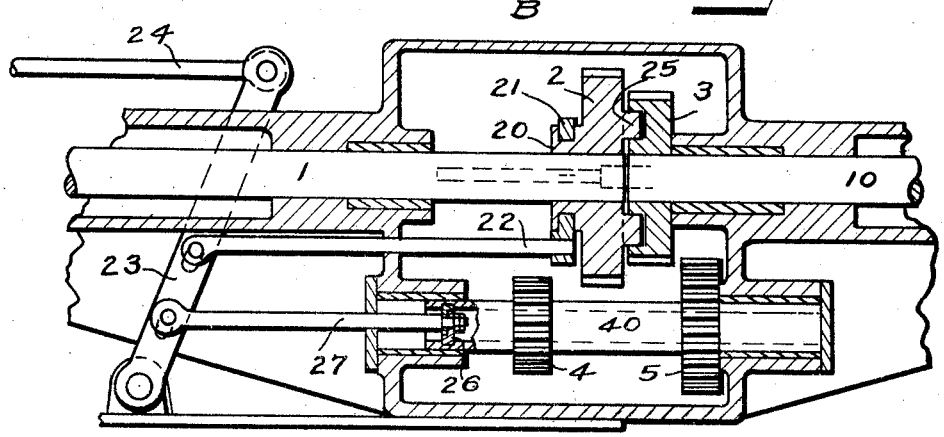
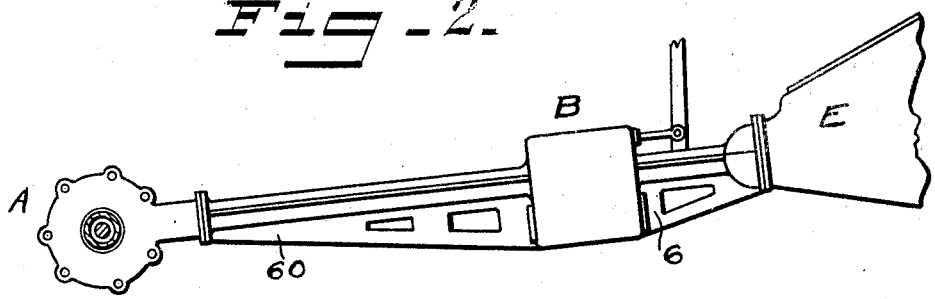
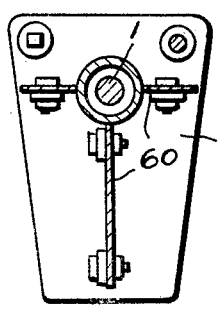
Inventor
George W. Steele
By H. L. & C. R. Reynolds
Attorneys Patented Mar. 17, 1925.

1,530,215

UNITED STATES PATENT OFFICE.

GEORGE W. STEELE, OF CEDAR FALLS, WASHINGTON.

AUXILIARY CHANGE-SPEED GEARING FOR MOTOR CARS.

Application filed May 26, 1924. Serial No. 715,910.

*To all whom it may concern:*

Be it known that I, GEORGE W. STEELE, a citizen of the United States of America, and resident of the town of Cedar Falls, in the county of King and State of Washington, have invented certain new and useful Improvements in Auxiliary Change-Speed Gearing for Motor Cars, of which the following is a specification.

My invention relates to change-speed gearing for motor cars and is intended particularly for use as an auxiliary to the ordinary or usual change-speed gearing.

The object of this device is to provide what may be termed an over-drive or an under-drive for motor cars. The device is designed to be applied so that in one way it functions as an over-drive, while when applied in the reverse relation it functions as an under-drive.

One object of my invention is to provide a device of this character of such design that it may be substituted for the transmission shaft of an automobile of standard build, without having to fit or to construct new parts for this purpose.

The novel features of my device upon which I desire to secure a patent, will first be hereinafter described and then defined in the claim.

In the accompanying drawings I have shown my invention embodied in three slightly different types of construction, all however having the same principles incorporated therein.

Figure 1 is a longitudinal section through the change-speed gearing of the device, showing one form of construction.

Figure 2 is an elevation showing in somewhat diagrammatic style the manner of connecting my device up with the driving and driven portions of the power line in which it is incorporated.

Figure 3 is a transverse section taken just outside of the gear chamber.

Referring first to Figure 2, E represents the rear portion of an engine casing, or as the case may be, the rear portion of the ordinary change-speed gearing, and A the mechanism by which the transmission shaft is connected with the rear axle for driving the same. These parts will vary in construction in accordance with the usual variations in different cars. My device will be designed for connecting in cars of different makes, the design of course varying in accordance with the variations of the different cars.

The change-speed gearing of my device is incorporated in the central box or section B of the casing of the device. This box has therein the ends of two shafts 1 and 10, one of which connects with the engine while the other connects with the differential or equivalent mechanism by which the rear axle is driven. The connection of these two shafts with the engine or gear shift and with the axle of the car will be reversed in accordance with whether the drive is to be used as an overdrive or an under-drive.

The abutting ends of the two shafts 1 and 10 are each provided with a gear as 2 and 3. These differ in size and are designed to mesh respectively with the gear 4 and the gear 5 mounted upon a stub shaft 40. These are all incorporated within the casing or box B, which latter is made tight and designed to hold oil for lubrication purposes.

The two wheels 2 and 3 are provided with means whereby they may be locked together so that when so connected the two shafts 1 and 10 will function as would a continuous shaft. One of these gears, as the gear 3, is fixedly secured to its shaft. The other gear, as 2, is mounted to turn with its shaft but so that it may be slid lengthwise thereof. This gear is provided with a collar 20 having a groove therein receiving a shifting ring 21, which shifting ring is connected with manually operable mechanisms, as by a link 22 and lever 23, so that the gear may be shifted along its shaft. The particular shifting means employed are immaterial.

In the particular form of mechanism shown in Figure 1 the two gears are provided one with projecting lugs 25 and the other with recesses for receiving the same, these constituting, in effect, a jaw clutch by which the two gears may be secured together. It is evident that if the gear 2 be shifted so as to disengage it from the gear 3 and then further so as to engage it with the gear 4, the speed ratio between the two shafts 1 and 10 will be changed. If the shaft 1 is the shaft which is connected with the engine through the usual gear shift box, the speed of rotation of the shaft 10 will be increased. If, however, the shaft 1 is the one which is connected with the axle, the speed of rotation of this will be lowered from that of the shaft 10 which connects with the engine. In the one case the device will function as an over-drive and in the other case as an under-drive.

The box or casing B may have extension brackets as 6 and 60, extending in opposite directions therefrom and integral with the casing B. In this case the outer ends of the two brackets 6 and 60 will be designed for attachment one to the gear shift mechanism of usual construction and the other to the differential casing. If these two ends be made exactly alike or if a suitable adapter be employed between them, the device may be reversed bodily, thus making it possible for a person of limited mechanical ability and equipment to install the device either as an over-drive or an under-drive.

In the device shown in Figure 1 the gear 2 is keyed upon its shaft so that it may be slid lengthwise thereof to engage and disengage its box with the wheel 3. The stub shaft 40 is also mounted so as to slide in its bearings. Consequently the stub shaft 40 and its two wheels in one position of the device, being that shown, are not connected up with the other gears, and there is no friction lost between gears when the device is in this position. When, however, the gear 2 is shifted so as to free it from the gear 3, the jaws of the clutch are first disengaged, and the gear 5 is caused to mesh with the gear 3 and the gear 2 to mesh with the gear 4. This is done by connecting both the shaft 40 and the gear 2 with the operating lever 23, through two links 22 and 22' at different distances from the center. This causes the gear 2 to travel a greater distance than the shaft 40 and its gears. The operating lever 23 may be connected with a manually operated lever through a link as 24, thus making it possible to put the manually operated lever in a convenient position. As the shaft 40 will at times be turning, it is necessary, in the construction shown, to provide a rotative element which will permit of this rotation. This is shown as secured by providing a head 26 composed of segments secured upon the section 27 of the link, and fitting within a circular groove formed in the inner face of the hollow shaft 40. Any other suitable plan of a rotative joint may be employed.

What I claim as my invention is:

A supplemental change gear mechanism for automobiles comprising abutting shaft sections; a gear fixed to the end of one of these shaft sections; a gear secured to and slidable upon the adjacent end of the other shaft section, said gears having face clutch members adapted to engage to drive one from the other, a stub shaft journaled parallel with the first named shafts and having two gears fixed thereon and adapted each to mesh with its respective one of the two first mentioned gears; said stub shaft being shiftable endwise, a pivoted shift lever, two links connected with said lever at different distances from its pivot and connecting, one with the shifting gear and the other with the stub shaft, whereby in one position each gear upon the stub shaft is connected with its respective one of the gears of the other pair and in the other position the gears upon the stub shaft are disconnected from the other gears and said other gears are connected together by their clutch members.

Signed at King County, Washington, this 17th day of May, 1924.

GEORGE W. STEELE.